(12) United States Patent
Min et al.

(10) Patent No.: US 11,087,174 B2
(45) Date of Patent: Aug. 10, 2021

(54) DEEP GROUP DISENTANGLED EMBEDDING AND NETWORK WEIGHT GENERATION FOR VISUAL INSPECTION

(71) Applicant: NEC Laboratories America, Inc., Princeton, NJ (US)

(72) Inventors: Renqiang Min, Princeton, NJ (US); Kai Li, Somerville, MA (US); Bing Bai, Princeton Junction, NJ (US); Hans Peter Graf, South Amboy, NJ (US)

(73) Assignee: NEC Corporation

( * ) Notice: Subject to any disclaimer, the term of this patent is extended or adjusted under 35 U.S.C. 154(b) by 153 days.

(21) Appl. No.: 16/580,497

(22) Filed: Sep. 24, 2019

(65) Prior Publication Data

US 2020/0097771 A1 Mar. 26, 2020

Related U.S. Application Data

(63) Continuation-in-part of application No. 16/580,199, filed on Sep. 24, 2019.

(Continued)

(51) Int. Cl.
*G06K 9/62* (2006.01)
*G06T 7/00* (2017.01)
(Continued)

(52) U.S. Cl.
CPC .......... *G06K 9/6257* (2013.01); *G06K 9/628* (2013.01); *G06K 9/6262* (2013.01);
(Continued)

(58) Field of Classification Search
None
See application file for complete search history.

(56) References Cited

U.S. PATENT DOCUMENTS

| | | | |
|---|---|---|---|
| 9,514,391 B2 * | 12/2016 | Perronnin | G06K 9/6247 |
| 2019/0065576 A1 * | 2/2019 | Peng | G06F 16/22 |
| 2019/0258878 A1 * | 8/2019 | Koivisto | G05D 1/00 |

OTHER PUBLICATIONS

Snell et al., "Prototypical Networks for Few-shot Learning", 31st Conference on Neural Information Processing Systems (NIPS 2017), Dec. 2017, pp. 1-11.

(Continued)

*Primary Examiner* — Vikkram Bali
(74) *Attorney, Agent, or Firm* — Joseph Kolodka

(57) ABSTRACT

A method is provided for visual inspection. The method includes learning, by a processor, group disentangled visual feature embedding vectors of input images. The input images include defective objects and defect-free objects. The method further includes generating, by the processor using a weight generation network, classification weights from visual features and semantic descriptions. Both the visual features and the semantic descriptions are for predicting defective and defect-free labels. The method also includes calculating, by the processor, a cosine similarity score between the classification weights and the group disentangled visual feature embedding vectors. The method additionally includes episodically training, by the processor, the weight generation network on the input images to update parameters of the weight generation network. The method further includes generating, by the processor using the trained weight generation network, a prediction of a test image as including any of defective objects and defect-free objects.

20 Claims, 9 Drawing Sheets

Related U.S. Application Data

(60) Provisional application No. 62/799,356, filed on Jan. 31, 2019, provisional application No. 62/767,158, filed on Nov. 14, 2018, provisional application No. 62/736,004, filed on Sep. 25, 2018.

(51) Int. Cl.
*G06N 3/04* (2006.01)
*G06N 3/08* (2006.01)

(52) U.S. Cl.
CPC ............ *G06N 3/0454* (2013.01); *G06N 3/08* (2013.01); *G06T 7/0004* (2013.01); *G06T 2207/20081* (2013.01); *G06T 2207/20084* (2013.01)

(56) References Cited

OTHER PUBLICATIONS

Sung et al., "Learning to Compare: Relation Network for Few-Shot Learning", arXiv:1711.06025v2 [cs.CV] Mar. 27, 2018, pp. 1-10.
Vasawani et al., "Attention Is All You Need", arXiv:1706.03762v5 [cs.CL] Dec. 6, 2017, pp. 1-11 pages.
Zhang et al., "Learning a Deep Embedding Model for Zero-Shot Learning", 2017 IEEE Conference on Computer Vision and Pattern Recognition (CVPR), Jul. 2017, pp. 2021-2030.

\* cited by examiner

Algorithm 1. Proposed approach for inductive ZSL

Input: Training set $\mathcal{D}_s = \{\mathcal{X}_s, \mathcal{Y}_s\}$ and attributes $\mathcal{A}_s$.
Output: classification weight generation network $g_\phi$
while not done do
   1. Randomly sample from $\mathcal{D}_s$ and $\mathcal{A}_s$
     a ZSL task $\mathcal{T} = \{\mathcal{B}_v, \mathcal{B}_a\}$, where
     $\mathcal{B}_v = \{\{x_{i,j}\}_{i=1}^{N_z}, y_j\}_{j=1}^{M_z}$ and $\mathcal{B}_a = \{a_j\}_{j=1}^{M_z}$.
   2. Calculate loss according to Eq. 2
   3. Update $g_\phi$ through back-propagation.
end while

FIG. 5

DEEP GROUP DISENTANGLED EMBEDDING AND NETWORK WEIGHT GENERATION FOR VISUAL INSPECTION

RELATED APPLICATION INFORMATION

This application claims priority to non-provisional application Ser. No. 16/580,199 filed on Sep. 24, 2019, provisional application Ser. No. 62/736,004 filed on Sep. 25, 2018, application Ser. No. 62/767,158 filed on Oct. 14, 2018 and provisional application Ser. No. 62/799,356 filed on Jan. 31, 2019 incorporated herein by reference.

BACKGROUND

Technical Field

The present invention relates to artificial neural networks, and more particularly to deep group disentangled embedding and network weight generation for visual inspection.

Description of the Related Art

In the manufacturing industry, the product quality is of critical importance. Hence, there is a need for improved approaches for visual inspection to determine product quality.

SUMMARY

According to an aspect of the present invention, a computer-implemented method is provided for visual inspection. The method includes learning, by a hardware processor, group disentangled visual feature embedding vectors of input images. The input images include defective objects and defect-free objects. The method further includes generating, by a hardware processor using a weight generation network, classification weights from visual features and semantic descriptions. Both the visual features and the semantic descriptions are for predicting defective and defect-free labels. The method also includes calculating, by a hardware processor, a cosine similarity score between the classification weights and the group disentangled visual feature embedding vectors. The method additionally includes episodically training, by the hardware processor, the weight generation network on the input images to update parameters of the weight generation network. The method further includes generating, by the hardware processor using the trained weight generation network, a prediction of a test image as including any of defective objects and defect-free objects.

According to another aspect of the present invention, a computer program product is provided for visual inspection. The computer program product includes a non-transitory computer readable storage medium having program instructions embodied therewith. The program instructions are executable by a computer to cause the computer to perform a method. The method includes learning, by a hardware processor, group disentangled visual feature embedding vectors of input images. The input images include defective objects and defect-free objects. The method further includes generating, by a hardware processor using a weight generation network, classification weights from visual features and semantic descriptions. Both the visual features and the semantic descriptions are for predicting defective and defect-free labels. The method also includes calculating, by a hardware processor, a cosine similarity score between the classification weights and the group disentangled visual feature embedding vectors. The method additionally includes episodically training, by the hardware processor, the weight generation network on the input images to update parameters of the weight generation network. The method further includes generating, by the hardware processor using the trained weight generation network, a prediction of a test image as including any of defective objects and defect-free objects.

According to yet another aspect of the present invention, a computer processing system is provided for visual inspection. The computer processing system includes a memory device including program code stored thereon. The computer processing system further includes a hardware processor, operatively coupled to the memory device, and configured to run the program code stored on the memory device to learn group disentangled visual feature embedding vectors of input images. The input images include defective objects and defect-free objects. The hardware processor further runs the program code to generate, using a weight generation network, classification weights from visual features and semantic descriptions. Both the visual features and the semantic descriptions are for predicting defective and defect-free labels. The hardware processor also runs the program code to calculate a cosine similarity score between the classification weights and the group disentangled visual feature embedding vectors. The hardware processor additionally runs the program code to episodically train the weight generation network on the input images to update parameters of the weight generation network. The processor further runs the program code to generate, using the trained weight generation network, a prediction of a test image as including any of defective objects and defect-free objects.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a diagram showing exemplary pseudocode for inductive Zero Shot Learning, in accordance with an embodiment of the present invention.

DETAILED DESCRIPTION OF PREFERRED EMBODIMENTS

Embodiments of the present invention are directed to deep group disentangled embedding and network weight generation for visual inspection.

Herein, a visual inspection AI system is proposed that predicts the labels of products (no (al product and defect product types) trained on a few or even no defect product images. When a few defect product images in each defect type are given, it is called Few-Shot Learning (FSL). When no defect product image but the description of the defect type is given, it is called Zero-Shot Learning (ZSL).

Although the AI system proposed herein focuses on the application of visual inspection, it can be easily deployed for other applications such as danger prediction in autonomous driving and surveillance, in which the input and output are similar. The present invention can be applied to these and other applications, as readily appreciated given the teachings of the present invention provided herein.

Additionally, embodiments of the present invention are directed to network reparameterization for new class categorization. As used herein, the term "reparameterization" refers to "reparametrizing the learnable weights of a neural network as a function of other variables".

By using the aforementioned reparameterization, classification of images corresponding to new classes can be achieved when faced with limited exemplary class information such as a number of semantic attributes and/or a small number of labeled examples with the total number below a threshold amount. The threshold amount can be set by a user depending upon the application and/or the amount of available labeled examples. These and other features of the present invention are readily determined by one of ordinary skill in the art given the teachings of the present invention provided herein.

Figure 1:
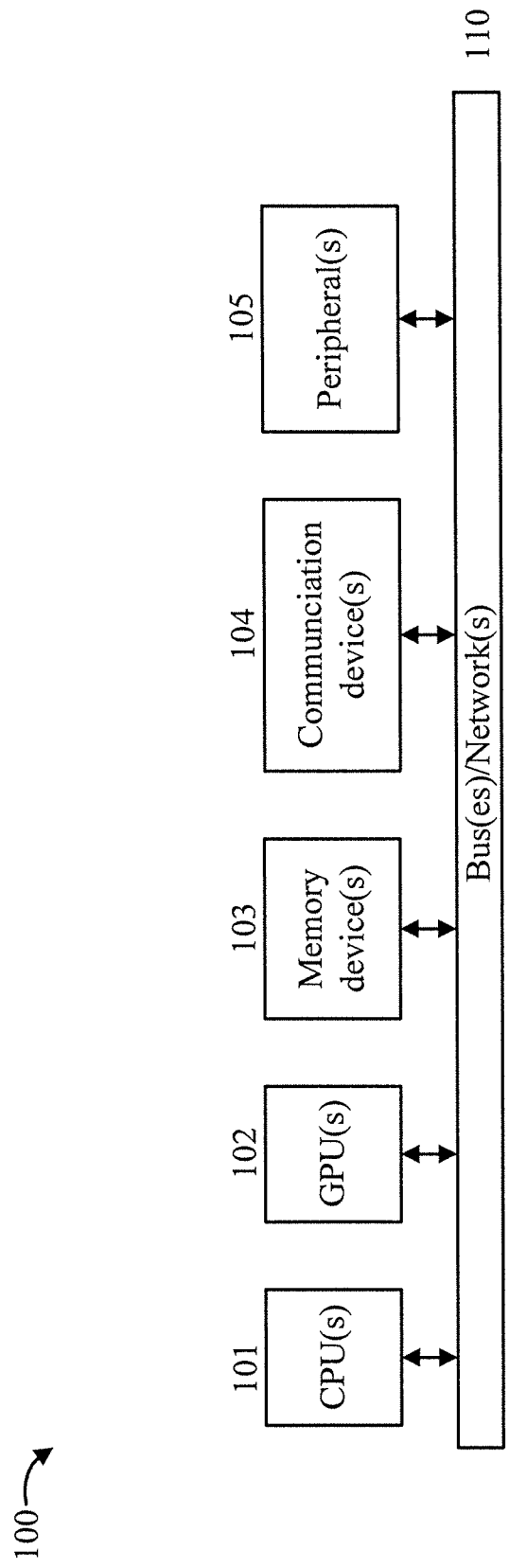
FIG. 1 is a block diagram illustrating an exemplary processing system to which the present principles may be applied, according to an embodiment of the present principles.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In embodiment, special purpose hardware (e.g., Application Specific Integrated Circuits, and so forth) can be used to implement various aspects of the present invention. In an embodiment, one or more elements from FIG. 2 can be implemented as a module stored in memory devices 103.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

In accordance with various embodiments of the present invention, two factors are provided to enable New Class Categorization (NCC). The first factor is a powerful feature extractor that outputs discriminative feature representations for any given image. The second factor is a flexible classifier model that can be easily adapted to new classes with scarce information provided.

By training a deep model in an episode-based way, occasionally with some well-designed deep neural network updating rules, the present invention can provide a deep model that is adaptive to new classes. In each episode, some randomly sampled classes are selected and serve as a NCC task for the model. The model learns how to be adaptive to new tasks after many training episodes. Then, during the testing stage, as a new NCC task is presented, the model can handle it well using the knowledge the model has learned during the training. However, we found that this episode-based training strategy limits the discriminative capability of the feature extraction model because it does not fully exploit the diversity and variance of all classes within the training dataset. The model treats the classes in each episode as new classes and attempts to separate them so that it does not have memory of the competing information of these classes with the other ones within the dataset but beyond the current episode. Due to the neglect of this global information, the capability of the feature extraction model is suppressed, thus limiting the NCC performance.

With regard to the form of the exemplar information provided about new classes, categorization can be classified as zero-shot learning (ZSL) and few-shot learning (FSL).

ZSL emerges in situations where we have never seen a class before but get some semantic descriptions of the class. We need to recognize the class based on the semantic descriptions. In practice, ZSL is performed by first learning an embedding space where semantic vectors and the visual feature are interacted and second finding the best among semantic vectors of new classes that matches the visual feature of any given image of the new classes within the learned embedding space. Since the embedding space is often of high dimension, finding the best match of a given vector among many candidates shall inevitably encounter the hubness problem, i.e., some candidates will be biased to be the best matches for many of the queries. Depending on the chosen embedding space, the severity of this problem varies.

In accordance with one or more embodiments of the present invention directed to ZSL, we formulate bridging the semantic space and the visual space as a visual feature classification problem conditioned on the semantic features. A model is learned that generates classification weights of the visual feature when fed with semantic features. Due to the nature of the classification problem, both intra-class compactness (visual features of the same classes are assigned with the same label) and inter-class separability (visual features of different classes are assigned with different labels) are exploited, thus resulting in a better mapping.

Regarding FSL, the same aims to recognize new classes when provided with one/a few labeled samples of these classes. Further regarding FSL, one or more embodiments of the present invention use a standard deep CNN model to get the feature extraction model.

It is proposed herein to secure both of the above two factors through network reparameterization, i.e., reparametrizing the learnable weights of a network as a function of other variables. It is proposed to decouple the feature extractor and classifier of a deep classification model and learn the feature extractor as a standard multi-class classification task to ensure a discriminative feature extractor. As used herein, the term "deep classification model" refers to a deep neural network trained for multi-class classification that can have a flexible architecture suitable for the input data under consideration. For the classifier, a generic classification weight generator is learned which outputs classification weights given limited exemplar information about the classes. The classification weight generator is trained by following the episode-based training scheme to secure the flexibility and adaptability. Embodiments of the present invention can be flexibly applied to both ZSL and FSL, where the exemplar information about unseen are provided in the form of the semantic attributes or one/a few labeled samples, respectively.

One of the most distinct aspects of one or more embodiments of the present invention from existing approaches is that we decouple the feature extractor part and the classifier part of the deep classification model, and obtain each part in the most beneficial tasks. The feature extractor is trained as a standard multi-class classification task. This is motivated by the observation that a simple linear classifier (e.g., nearest neighbor), when taking as input features obtained by a powerful extractor, can outperform some sophisticated FSL models that use weaker feature extraction models.

Embodiments of the present invention are directed to novel categorization, which is to recognize objects of new classes given only minimal information (a few labeled samples or the attributes) of the classes. Formally, consider that there are three datasets $D=\{D_t, D_s, D_u\}$, where $D_t=\{X_t, Y_t\}$ is the training set and $D_u=\{X_u, Y_u\}$ is the test set, with $X_t$ and $X_u$ being the images, and $Y_t$ and $Y_u$ being the corresponding labels. There is no overlap between training classes and testing classes, i.e., $Y_t \cap Y_u = \emptyset$. The goal of novel categorization is to learn from $D_t$ generic information that can be applied to classify new classes from $D_u$, with the help of supporting information from $D_s$. For ZSL, $D_s = A_t \cup A_u$ is the union of the semantic attribute vectors $A_t$ for seen classes $Y_t$ and $A_u$ for new classes $Y_u$. For FSL, $D_s$ includes one or a few images and their labels for each class from $D_u$, i.e., $D_s = \{X_s, Y_s\}$ with $Y_s \subseteq Y_u$.

Advantageously, the present invention provides a framework that can address both ZSL and FSL with minimal changes.

Figure 2:
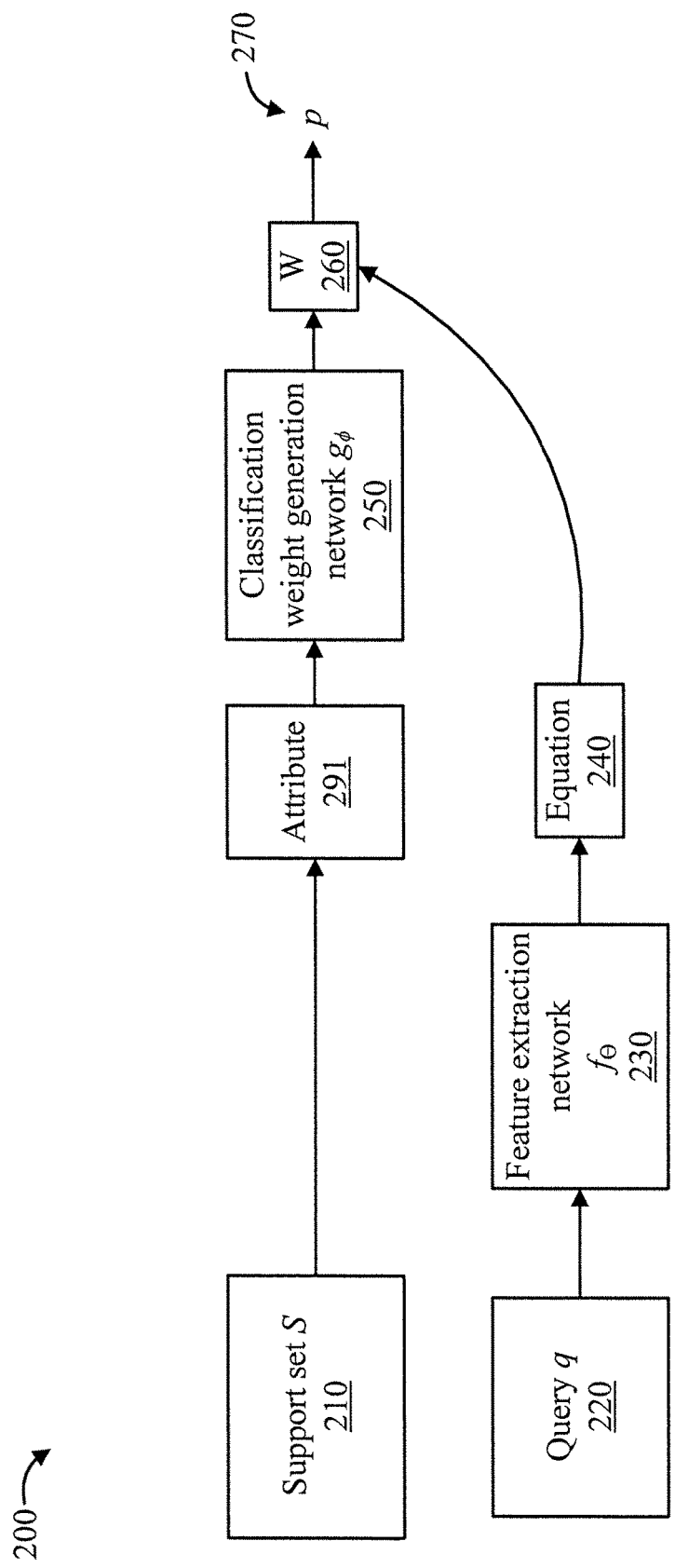
FIG. 2 is a diagram showing an exemplary Zero Shot Learning (ZSL) system, in accordance with an embodiment of the present invention.

FIG. 2 is a diagram showing an exemplary Zero Shot Learning (ZSL) system 200, in accordance with an embodiment of the present invention.

Figure 3:
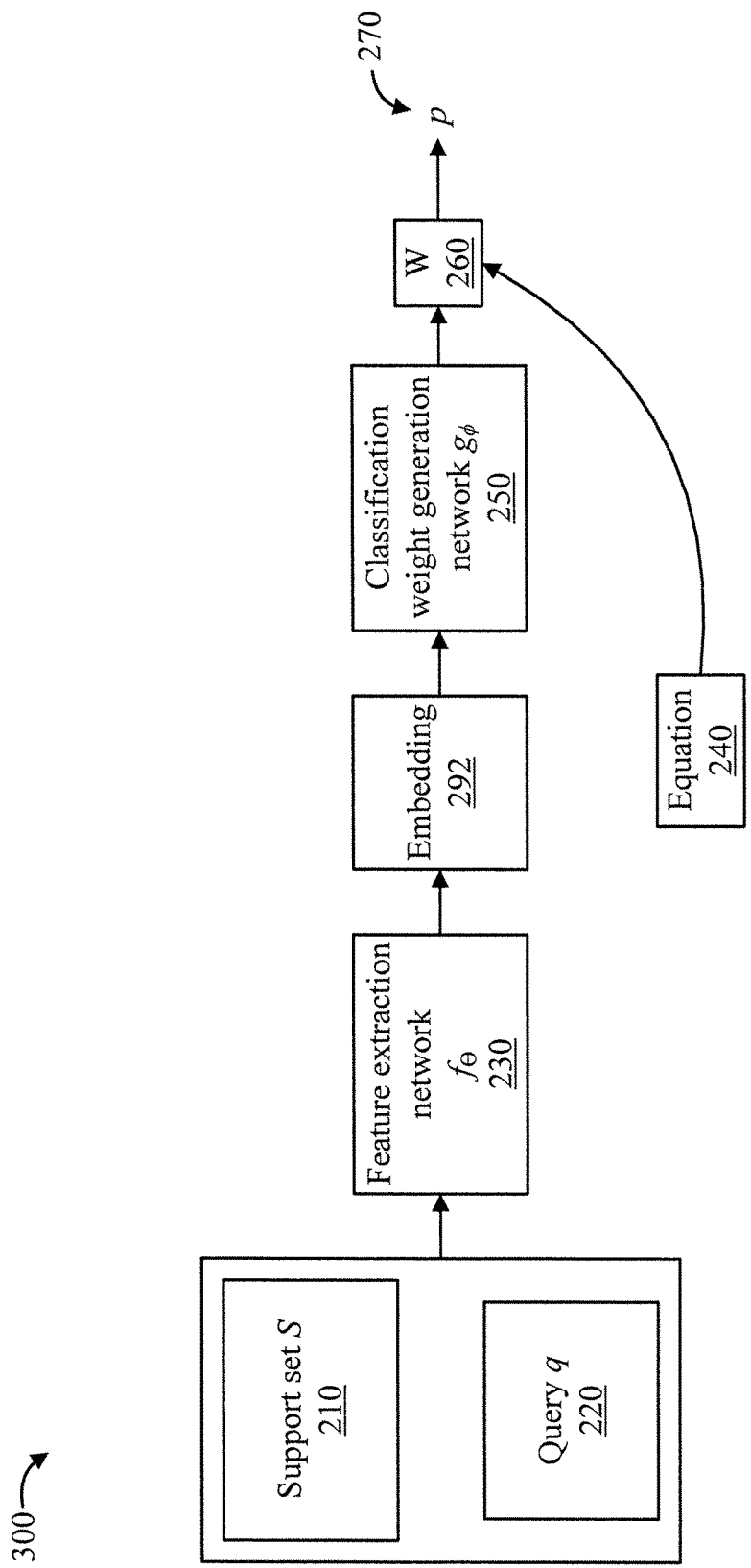
FIG. 3 is a diagram showing an exemplary Few Shot Learning (FSL) system, in accordance with an embodiment of the present invention.

FIG. 3 is a diagram showing an exemplary Few Shot Learning (FSL) system 300, in accordance with an embodiment of the present invention.

In FIGS. 2 and 3, systems 200 and 300 both include a support set S 210, a query Q 220, a feature extraction network 230, an equation 240, a classification weight generation network 250, a weight W 260, and a prediction p 270.

In FIG. 2, attributes 291 are shown relative to ZSL.

In FIG. 3, embeddings 292 are shown relative to FSL.

In FIGS. 2 and 3, $p = \mathrm{softmax}(g_\phi(f_\theta(S))^T f_\theta(q))$.

Instead of jointly learning the feature extraction network weights and classification weights, which results in a heavy model that is hard to be adjusted for new classes with limited information, the learnable variables of a classification network are reparametrized as the combination of learnable variables of a feature extraction network and a weight generation network. In other words, the feature extraction network $f_\theta$ is decoupled from the classification weight W of a standard classification network. The feature extraction network $f_\theta$ is trained as a standard multi-class classification task to ensure a powerful feature extractor. Another network $g_\phi$ is learned to generate the classification weight W. Since $f_\theta$ is trained as a standard multiclass classification task to distinguish all classes within the training set, the resultant feature extractor is supposed to be able to generate more discriminative feature representation for images of new classes than that generated by a model trained in episode-based fashion where the model is trained to distinguish several classes within mini-batches. Meanwhile, $g_\phi$ is trained in episode-based fashion by constantly sampling new classes and minimizing the classification loss using the weights generated by $g_\phi$. After training, whenever some new classes come (e.g., in a query Q), along with supporting information in the form of either attribute vectors (ZLS) or few-labeled samples (FSL), $g_\phi$ generates generic classification weights that can effectively classify query images that belong to these new classes. Due to this network reparameterization strategy, a powerful yet flexible new class categorization model can be obtained.

Figure 4:
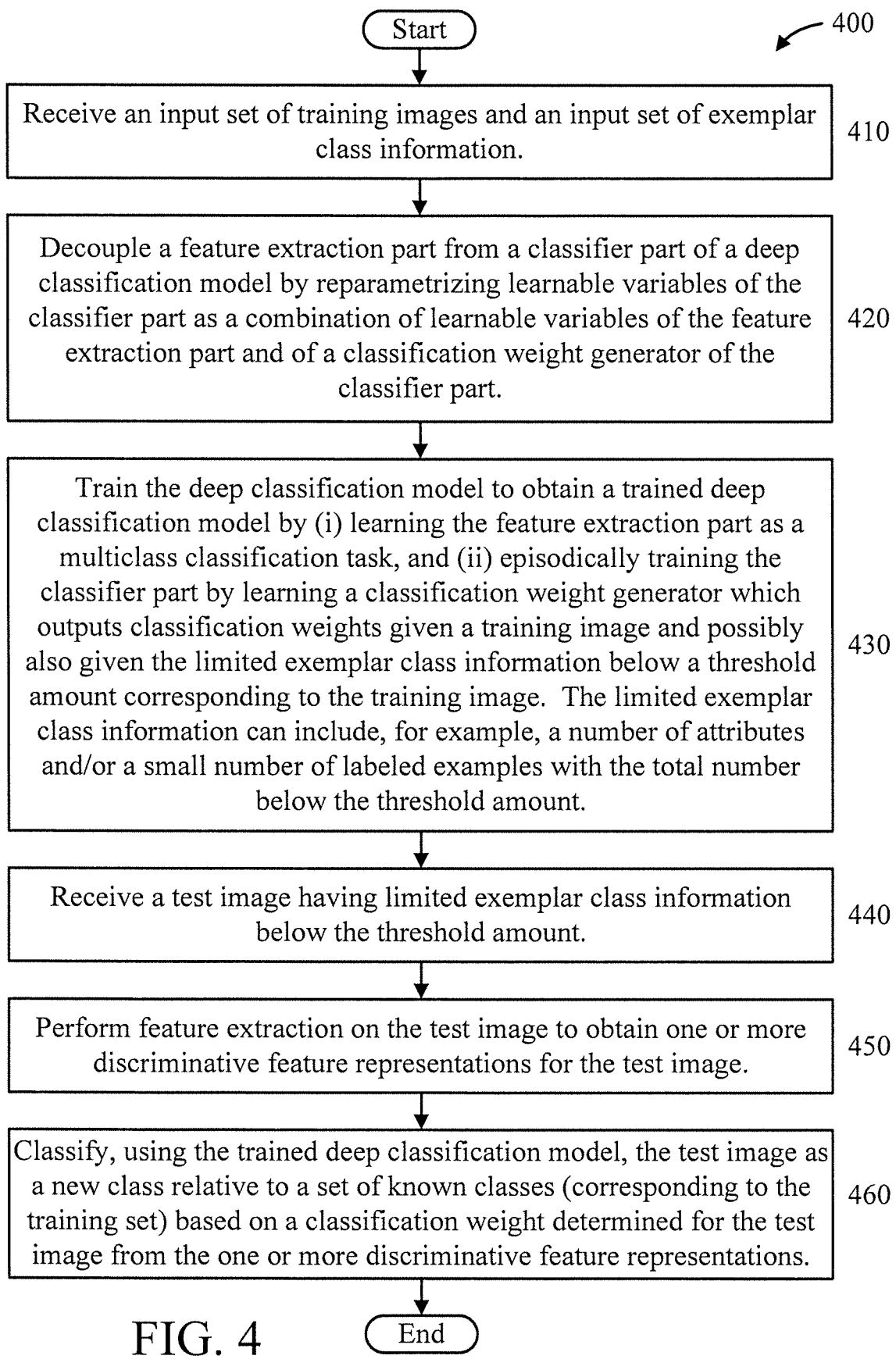
FIG. 4 is a flow diagram showing an exemplary method for New Class Categorization (NCC), in accordance with an embodiment of the present invention.

FIG. 4 is a flow diagram showing an exemplary method 400 for New Class Categorization (NCC), in accordance with an embodiment of the present invention.

At block 410, receive an input set of training images and an input set of exemplar class information.

At block 420, decouple a feature extraction part from a classifier part of a deep classification model by reparametrizing learnable variables of the classifier part as a combination of learnable variables of the feature extraction part and of a classification weight generator of the classifier part.

At block 430, train the deep classification model to obtain a trained deep classification model by (i) learning the feature extraction part as a multiclass classification task, and (ii) episodically training the classifier part by learning a classification weight generator which outputs classification weights given a training image and possibly also given the limited exemplar class information below a threshold amount corresponding to the training image. The limited exemplar class information can include, for example, a number of attributes and/or a small number of labeled examples with the total number below the threshold amount. In an embodiment, different thresholds can be used for the attributes versus the labels. In an embodiment, the same threshold can be used for the attributes and the labels. The determination of the thresholds can be performed by the user, and can be based on the amount of available attributes and/or labels, and/or other factors such as computation time, and so forth.

At block 440, receive a test image having limited exemplar class information below the threshold amount.

At block 450, perform feature extraction on the test image to obtain one or more discriminative feature representations for the test image.

At block 460, classify, using the trained deep classification model, the test image as a new class relative to a set of known classes (corresponding to the training set) based on a classification weight determined for the test image from the one or more discriminative feature representations.

Various descriptions follow regarding various features and aspects of the embodiments of the present invention.

A description will now be given regarding a cosine similarity based classifier, in accordance with one or more embodiments of the present invention.

The cosine similarity based softmax function is adopted to train the weight generator $g_\phi$. Cosine similarity is used for calculating a classification score in the last fully connected layer of deep neural network. This technique is adopted to train our weight generator $g_\phi$. The classification score of a sample (x, y) is calculated as $$p(y=n \mid x) = \frac{\exp(s\cos(w_n, f_\theta(x)))}{\sum_{j=1}^{N} \exp(s\cos(w_j, f_\theta(x)))}, \quad (1)$$

where s is a learnable scalar controlling the peakiness of the probability distribution generated by the softmax operator, and $m_j$ is the classification weight for class j. The classification score is generated by neural network $g_\phi$, taking supporting information of the class as input. Therefore, in a typical NCC task T, the loss function is calculated as $$L(\theta,\phi) = -\Sigma_{(x,y) \in T} \log p(y|x) + \lambda \|\phi\|\_2 \quad (2)$$

where λ is a hyper-parameter weighting the l2-norm regularization of the learnable variable of neural network $g_\phi$.

A further description will now be given regarding ZSL, in accordance with one or more embodiments of the present invention.

For zero-shot learning, class attributes $S=A_t \cup A_u$ are provided as the assistance for NCC. The basic assumption for existing ZSL algorithms is that the visual-attribute relationship learned from seen classes in a certain embedding space is class-invariant and can be applied on new classes. It is advantageous to select the visual space as the embedding space because the abundance of data diversity in the visual space can significantly mitigate the so-called "hubness" problem. The objective function is as follows:

$$L(\theta, \phi) = \frac{1}{M} \sum_{i=1}^{M} \|f_\theta(x_i) - h_\psi(a_{y_i})\|_2 + \lambda \|\psi\|_2 \quad (3)$$

where M is the total number of training examples, $f_\theta$ is a feature extraction model which output a representation vector $f_\theta(x_i)$ using image $x_i$ as input, and h is a mapping function which projects attribute vector $a_{y_i}$ of class $y_i$ to the embedding space where $f_\theta(x_i)$ lies. Through minimizing the least square embedding loss, the visual-attribute relationship can be established. With this relationship, in the testing stage, the attributes $A_u$ of new classes are mapped to the visual feature embedding space in which the visual feature of images of any new classes can find the best class attribute through nearest neighbor searching.

One can observe that this method learns the visual-attribute relationship by only utilizing the coincidence of the visual samples of a class with the associated semantic description. It however neglects to explore the inter-class separation of different classes, which shall be crucial to further avoid the hubness problem. To remedy this, we reformulate the learning of visual-attribute relationship from a regression problem to a visual feature classification problem. We directly learn a network $g_\phi$ that outputs the classification weights for classifying visual feature representations and use the Softmax loss in Equation (2) to guide the learning of the weight generation network. That is, the softmax function is used to guide learning of the weight generation network $g_\psi$ by minimizing the loss function in Equation (2) with $w_j = g_\psi(a_{y_j})$, j=1, ..., N for ZSL and $$w_j = \frac{1}{N} \sum_{j=1}^{N} f_\theta(x_j)$$

for FSL. Through this reformulation, both intra-class compactness and inter-class separability are elegantly exploited for learning the visual-attribute relationship: Visual features of the same classes should be assigned with the same label (compactness), while visual features of different classes are assigned with different labels (separability).

The network reparameterization scheme is followed by decoupling the feature extraction module and the classification weight module which is generated by $g_\phi$. The feature extraction module is trained as a standard multi-class classification task to enable us to obtain discriminative feature representation for any given image. To learn $g_\phi$, the episode based training scheme is adopted by continuously exposing $g_\phi$ with new (randomly sampled) ZSL tasks so as to secure good performance when real new tasks come in the testing stage. More specifically, we keep randomly sampling from $D_t = \{X_t, Y_t\}$ and $A_t$ ZSL tasks and feeding them to the network. Each task includes $M_z$ classes and the associated $M_z$ attribute vectors. For each class, $N_z$ images are randomly sampled. With a batch of $M_zN_z$ images and $M_z$ attribute vectors, $g_\phi$ is trained via minimizing the loss function defined in Equation 2. In the testing stage, given attributes of new classes $A_u$, or $S=A_s \cup A_u$ for both all (seen and unseen) classes as in generalized ZSL setting, the corresponding classification weights are generated using $g_\phi$. The generated classification weights, integrated with the feature extraction network $f_\theta$, serves as the ZSL classification model for unseen classes.

A further description will now be given regarding FSL, in accordance with one or more embodiments of the present invention.

For few-shot learning (FSL), one/a few labeled samples $D_s=\{X_s;Y_s\}$ for each new classes are provided to help recognize objects of these classes. Our novel categorization framework can be easily extended from ZSL to FSL, simply by replacing the semantic attributes with feature embeddings as the input for the classification weight generation network $g_\phi$. More specifically, we adhere to the network reparameterization training scheme and learn feature extraction network $f_\theta$ and classification weight W separately to secure a powerful feature extractor and a flexible classifier. The feature extraction network $f_\theta$ is trained as a standard multi-class classification task, but the weight generation network $g_\phi$ is trained in the episode-based manner to enable $g_\phi$ to grasp enough knowledge of classifying new classes based on one/a few labeled samples. In details, during the training, we keep randomly sampling from $D_f=\{X_f,Y_f\}$ FSL tasks, each of which includes a support set and a query image set. Images in both sets are from the same classes. The support set includes $M_f$ classes and $N_f$ images for each class. With the feature embeddings of the $M_f N_f$ images as input, $g_\phi$ generates the classification weights of the $M_f$ classes, which are then used to classify the feature embeddings of images from the query set. The same applies as in ZSL. Equation 2 is used to guide the learning process. Note that if $N_f>1$, i.e., each class has multiple support samples, the embeddings of all images belonging to the same class are averaged and fed to $g_\phi$.

A description will now be given regarding deep group disentangled embedding and network weight generation for visual inspection, in accordance with an embodiment of the present invention.

We propose to secure both key factors of ZSL and FSL through network reparameterization, i.e., reparametrizing the learnable weights of a network as a function of other variables. We decouple the feature extraction module and classification module of a deep classification model and learn the former as a standard multi-class classification task to ensure a discriminative feature extractor. For the classification module, we learn a generic classification weight generator which outputs classification weights given limited exemplar information about the classes. We train the classification weight generator by following the episode-based training scheme to secure flexibility and adaptability.

Our method can be flexibly applied to both ZSL and FSL. The only difference is: in ZSL, the exemplar information about unseen classes are provided in the form of the semantic attributes, and we project the semantic attributes to a visual feature embedding space to perform classification; in FSL, the exemplar information about unseen classes are provided in the form of one/a few labeled samples, and we project the labeled samples to a visual feature embedding space to perform classification.

Since ZSL and FSL are so similar to each other, we use ZSL in the following as a running example for algorithm descriptions.

FIG. 5 is a diagram showing exemplary pseudocode 500 for inductive Zero Shot Learning, in accordance with an embodiment of the present invention.

Zero-shot learning (ZSL) is used to recognize objects of unseen classes given only semantic descriptions of the classes. Formally, suppose we have three sets of data D={Ds; Da; Du}, where Ds={Xs; Ys} is the training set and Du={Xu; Yu} is the test set, with Xs and Xs being the images, and Ys and Yu being the corresponding labels. There is no overlap between training classes and testing classes, i.e., Ys and Yu do not overlap. The goal of ZSL is to learn transferable information from Ds that can be used to classify unseen classes from Du, with the help of semantic descriptions Da=As [Au for both seen (As) and unseen (Au) classes. Da could be human-annotated class attributes or tests describing the classes after some text-to-vector techniques.

A description will now be given regarding classifier weights for the visual embedding space, in accordance with an embodiment of the present invention. Given the semantic description vectors $A=\{a_i\}$, i=1, ..., N of N classes including normal class and different types of defect classes, we generate the classifier weights for the N classes using a neural network $g_\phi$ that maps semantic descriptions to classifier weights as follows:

$$W=g_\phi(A)$$

W is then be used to calculate classification score with the feature embedding of any given image $f_\theta(x)$ belonging to the N classes. $f_\theta$ is the feature embedding network, which can be trained as a variational autoencoder if there is no labeled data available or a standard deep neural network for classification if labeled training samples are available.

Instead of learning a standard distributed feature embedding function, we learn group disentangled embedding representations by $f_\theta$. In details, we split the embedding vector into K groups, the K groups are independent with each other, and we expect that different groups model different factors in the input data. Based on the group disentangled embedding vectors, we use a self-attention mechanism to construct new feature embedding vectors, which are used as the final embedding output of $f_\theta$.

To learn group disentangled feature representation in $f_\theta$, we introduce a discriminator D. We train the discriminator D by using the embedding vectors generated by a mini-batch of input training images as positive data, and then we shuffle the embedding vectors of this mini-batch in a group-wise fashion to get negative data. Specifically, we split an embedding vector into K groups. For each group i of embedding features, we shuffle the data indices as the negative data for feature group i, and then we concatenate the negative data of all feature groups to form the negative dataset. We update the parameters of D to discriminate positive data from negative data, and we update the parameters of $f_\theta$ to fool the discriminator D so that it cannot distinguish which is positive data and which is negative data. By this means, the learned K groups of embedding features will become as independent as possible.

A description will now be given regarding a cosine similarity based classification score function, in accordance with an embodiment of the present invention. Traditional multi-layer neural networks use dot product between the output vector of previous layer and the incoming weight vector as the input to an activation function.

Rather than using dot product to calculate a classification score, we define our score function as follows:

$$p(y = n \mid e_x) = \frac{\exp(\sigma\cos(w_y, e_x))}{\sum_{j=1}^{N} \exp(s\cos(w_j, e_x))},$$

where $\sigma$ is a learnable scalar controlling the peakiness of the probability distribution generated by the softmax operator, $w_y$ is the classification weight for class y generated from the semantic description of the class, and $e_x$ is the feature embedding of an image x belonging to class y using a feature embedding neural network $f_\theta$. Then standard cross-entropy loss is minimized to learn the parameters of the weight generation network $g_\varphi$.

A description will now be given regarding an episode-based training procedure, in accordance with an embodiment of the present invention. By approaching ZSL in virtue of neural network generation, our goal is to learn a flexible neural network generator such that it outputs a powerful classifier for unseen classes provided with their semantic descriptions. To this end, besides our novel classification weight generation technique and unique classification score function, we also propose a novel training criterion amenable for zero-shot learning. Our training procedure is based on a simple machine learning principle: testing and training conditions must match. Thus, to train our neural network generator to be able to generate a discriminative classifier given the semantic descriptions, we train it using tasks from minibatch to minibatch. This training procedure matches exactly how it will be tested when presented with the semantic descriptions of new classes and outputs a classifier to classify the images by class. More specifically, to train go, we keep randomly sampling from $D_t = \{X_t; Y_t\}$ and $A_t$ ZSL tasks and feeding them to the network. Each task includes $M_z$ classes and the associated $M_z$ attribute vectors. For each class, we randomly sample $N_z$ images. With a batch of $M_z N_z$ images $B_v$ and $M_z$ attribute vectors $B_a$, we train $g_\varphi$ by minimizing the standard cross-entropy loss function.

Figure 6:
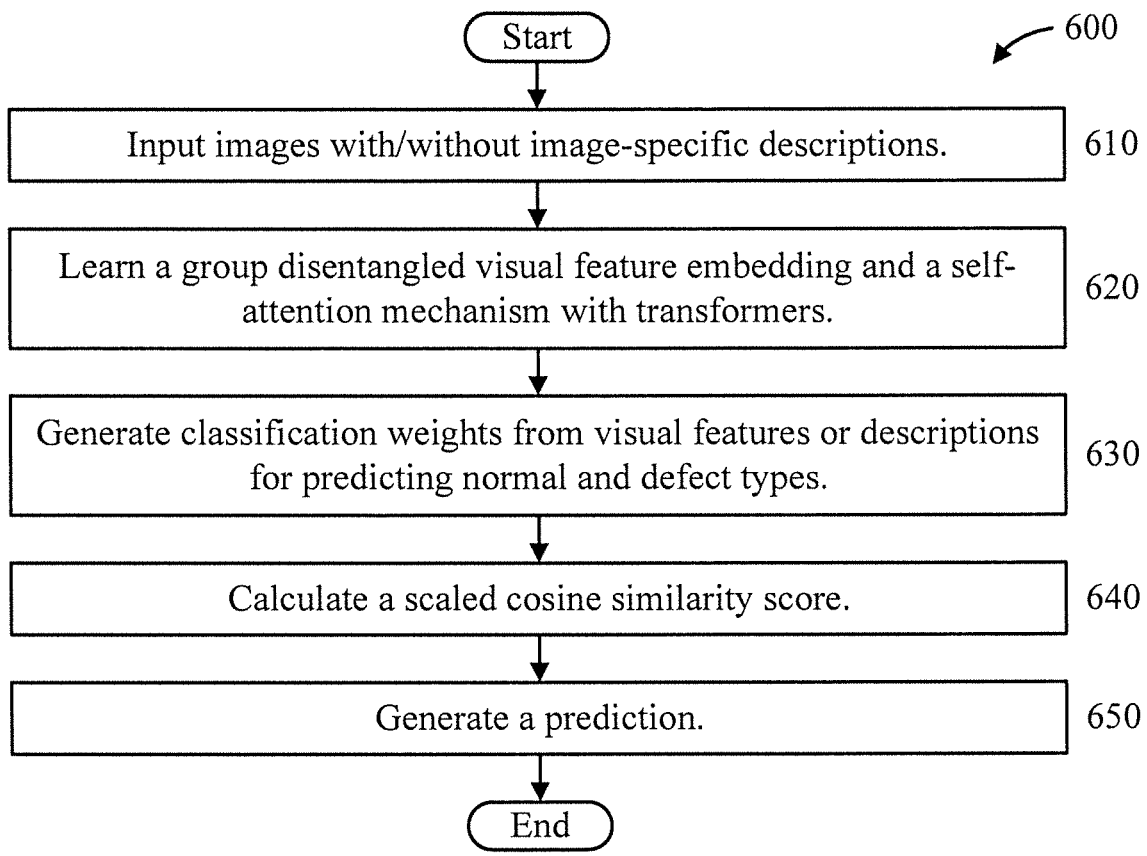
FIG. 6 is a flow diagram showing an exemplary visual inspection method, in accordance with an embodiment of the present invention.

FIG. 6 is a flow diagram showing an exemplary visual inspection method 700, in accordance with an embodiment of the present invention.

At block 610, input images with/without image-specific descriptions.

At block 620, learn a group disentangled visual feature embedding and a self-attention mechanism with transformers.

At block 630, generate classification weights from visual features or descriptions for predicting normal and defect types.

At block 640, calculate a scaled cosine similarity score.

At block 650, generate a prediction.

Figure 7:
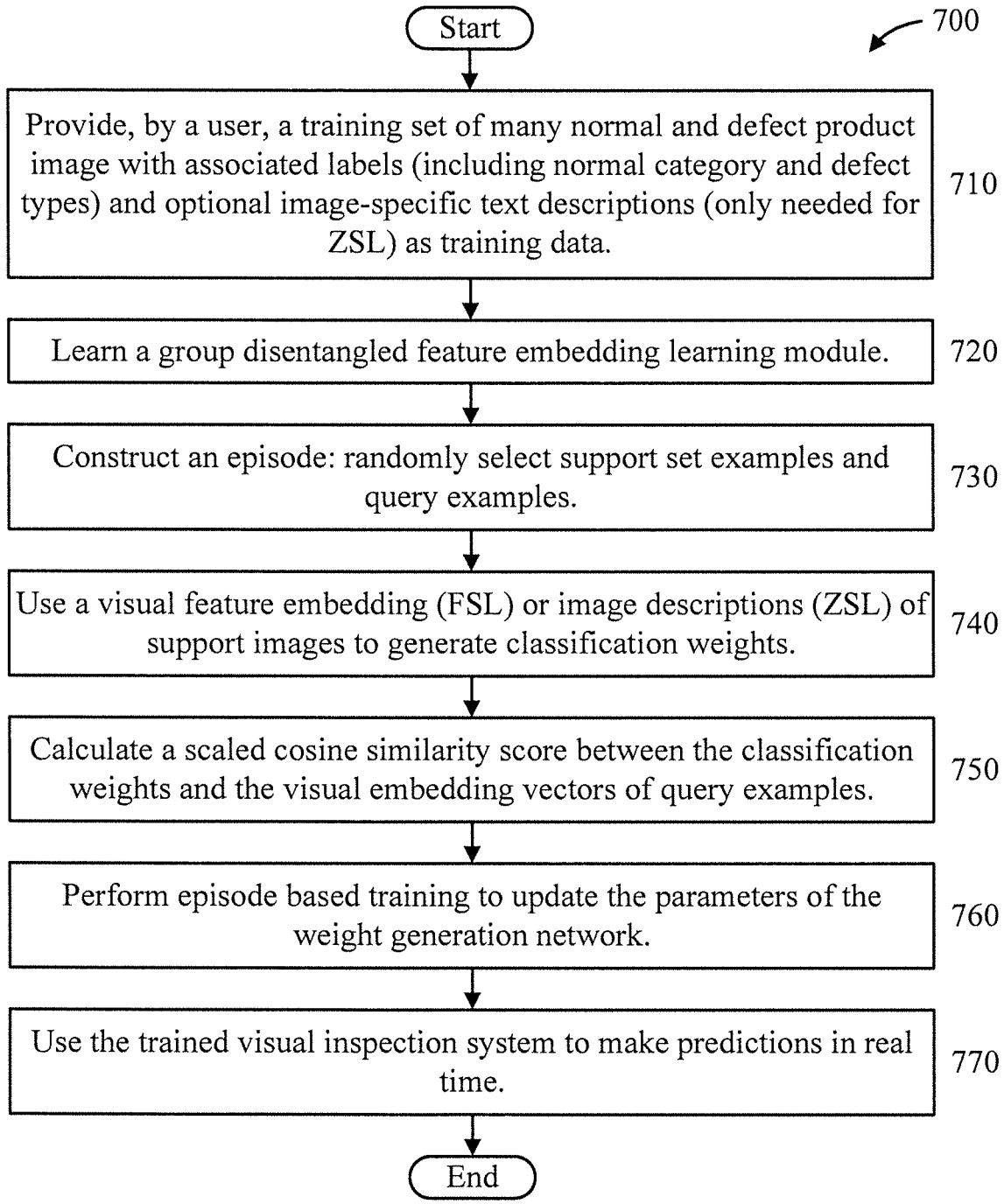
FIG. 7 is a flow diagram showing another exemplary real-time visual inspection method, in accordance with an embodiment of the present invention.

FIG. 7 is a flow diagram showing another exemplary real-time visual inspection method 700, in accordance with an embodiment of the present invention.

At block 710, provide, by a user, a training set of many normal and defect product image with associated labels (including normal category and defect types) and optional image-specific text descriptions (only needed for ZSL) as training data.

At block 720, learn a group disentangled feature embedding learning module.

At block 730, construct an episode: randomly select support set examples and query examples.

At block 740, use a visual feature embedding (FSL) or image descriptions (ZSL) of support images to generate classification weights.

At block 750, calculate a scaled cosine similarity score between the classification weights and the visual embedding vectors of query examples.

At block 760, perform episode based training to update the parameters of the weight generation network.

At block 770, use the trained visual inspection system to make predictions in real time.

Figure 8:
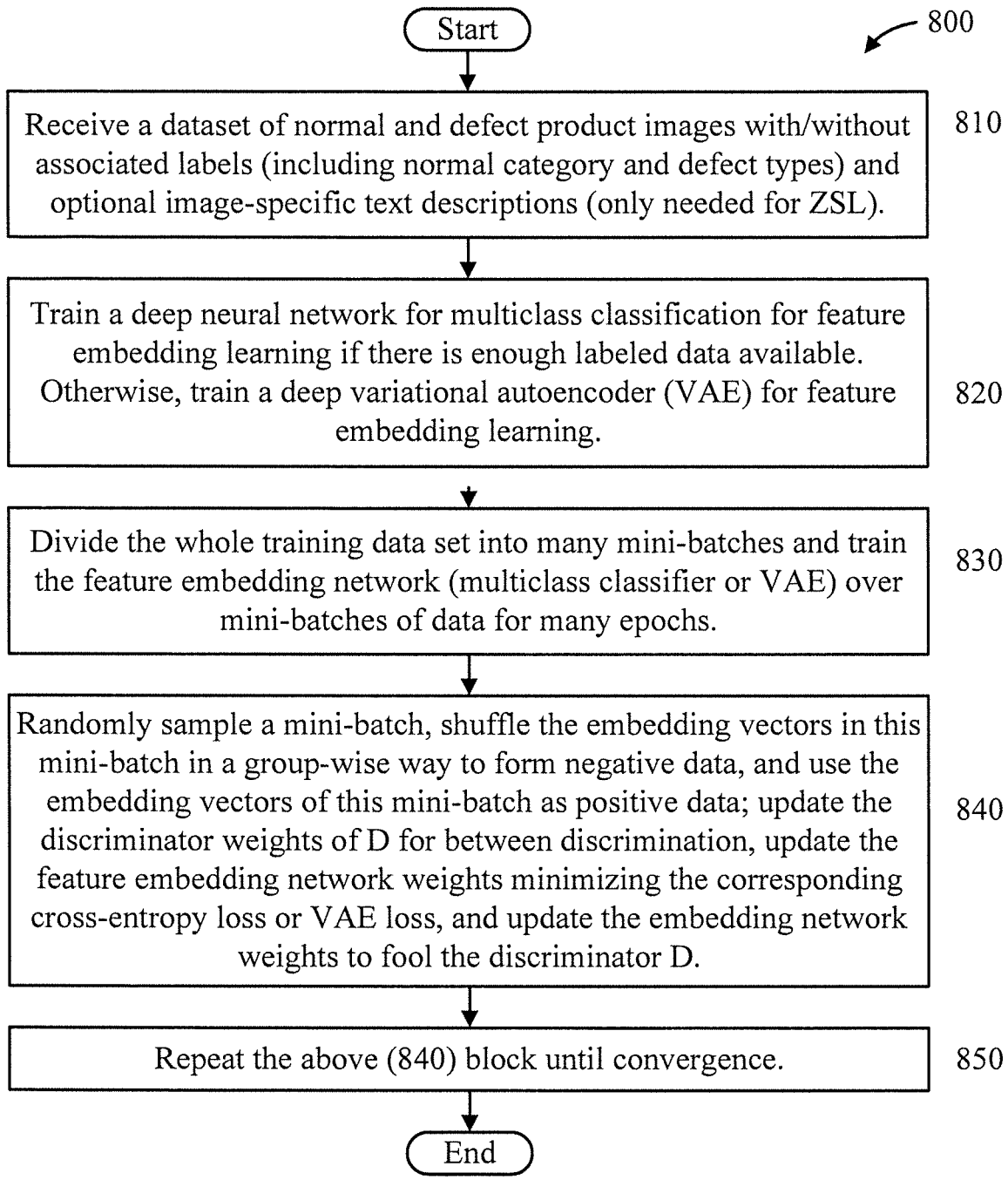
FIG. 8 is a flow diagram of a method for learning a group disentangled feature embedding learning module, in accordance with an embodiment of the present invention.

FIG. 8 is a flow diagram of a method 800 for learning a group disentangled feature embedding learning module, in accordance with an embodiment of the present invention.

At block 810, receive a dataset of normal and defect product images with/without associated labels (including normal category and defect types) and optional image-specific text descriptions (only needed for ZSL).

At block 820, train a deep neural network for multiclass classification for feature embedding learning if there is enough labeled data available. Otherwise, train a deep variational autoencoder (VAE) for feature embedding learning.

At block 830, divide the whole training data set into many mini-batches and train the feature embedding network (multiclass classifier or VAE) over mini-batches of data for many epochs.

At block 840, randomly sample a mini-batch, shuffle the embedding vectors in this mini-batch in a group-wise way to form negative data, and use the embedding vectors of this mini-batch as positive data; update the discriminator weights of D for between discrimination, update the feature embedding network weights minimizing the corresponding cross-entropy loss or VAE loss, and update the embedding network weights to fool the discriminator D.

At block 850, repeat the above (840) block until convergence.

Figure 9:
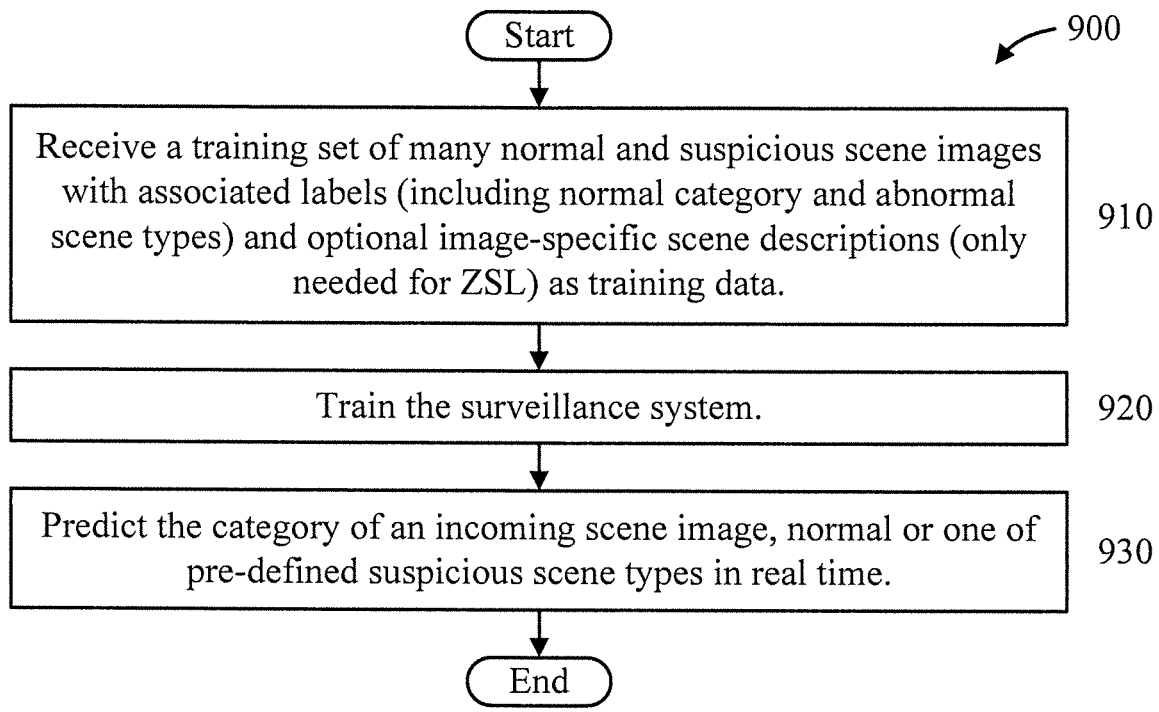
FIG. 9 is a flow diagram showing an exemplary method for online AI-based surveillance, in accordance with an embodiment of the present invention.

FIG. 9 is a flow diagram showing an exemplary method 900 for online AI-based surveillance, in accordance with an embodiment of the present invention.

At block 910, receive a training set of many normal and suspicious scene images with associated labels (including normal category and abnormal scene types) and optional image-specific scene descriptions (only needed for ZSL) as training data.

At block 920, train the surveillance system.

At block 930, predict the category of an incoming scene image, normal or one of pre-defined suspicious scene types in real time.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for visual inspection, comprising:
   learning, by a hardware processor, group disentangled visual feature embedding vectors of input images, the input images including defective objects and defect-free objects;
   generating, by the hardware processor using a weight generation network, classification weights from visual features and semantic descriptions, both the visual features and the semantic descriptions for predicting defective and defect-free labels;
   calculating, by the hardware processor, a cosine similarity score between the classification weights and the group disentangled visual feature embedding vectors;
   episodically training, by the hardware processor, the weight generation network on the input images to update parameters of the weight generation network; and
   generating, by the hardware processor using the trained weight generation network, a prediction of a test image as including any of defective objects and defect-free objects.

2. The computer-implemented method of claim 1, wherein the classification weights are generated given limited exemplar class information below a threshold amount.

3. The computer-implemented method of claim 2, wherein the limited exemplar class information comprises a number of semantic attributes below the threshold amount.

4. The computer-implemented method of claim 2, wherein the limited exemplar class information comprises a number of labeled examples below the threshold amount.

5. The computer-implemented method of claim 1, wherein said training step comprising training the classification weight generator using a cosine similarity based softmax function.

6. The computer-implemented method of claim 1, wherein the method is performed relative to a training set of images and a training set of exemplar class information corresponding to the training set of images.

7. The computer-implemented method of claim 1, wherein the group disentangled visual feature embedding vectors are learned using a feature embedding network implemented by a deep neural network configured to perform multiclass classification, when labeled data is available.

8. The computer-implemented method of claim 1, wherein the group disentangled visual feature embedding vectors are learned using a feature embedding network implemented by a deep autoencoder configured to perform input image reconstruction, when labeled data is unavailable.

9. The computer-implemented method of claim 1, wherein the weight generation network maps the visual features and the semantic descriptions to the classification weights.

10. The computer-implemented method of claim 1, wherein said learning step comprises:
    splitting the group disentangled visual feature embedding vectors into k groups that are independent with each other; and
    constructing new feature embedding vectors based on the k groups using a self-attention function.

11. The computer-implemented method of claim 1, wherein said learning step comprises:
    training a discriminator using the group disentangled visual feature embeddings vectors generated by a mini-batch of the input images as positive data;
    shuffling the group disentangled visual feature embeddings vectors of the mini-batch in a group-wise manner to obtain negative data; and
    training the discriminator with the negative data.

12. A computer program product for visual inspection, the computer program product comprising a non-transitory computer readable storage medium having program instructions embodied therewith, the program instructions executable by a computer to cause the computer to perform a method comprising:
    learning, by a hardware processor, group disentangled visual feature embedding vectors of input images, the input images including defective objects and defect-free objects;
    generating, by the hardware processor using a weight generation network, classification weights from visual features and semantic descriptions, both the visual features and the semantic descriptions for predicting defective and defect-free labels;
    calculating, by the hardware processor, a cosine similarity score between the classification weights and the group disentangled visual feature embedding vectors;
    episodically training, by the hardware processor, the weight generation network on the input images to update parameters of the weight generation network; and
    generating, by the hardware processor using the trained weight generation network, a prediction of a test image as including any of defective objects and defect-free objects.

13. The computer program product of claim 12, wherein said training step comprising training the classification weight generator using a cosine similarity based softmax function.

14. The computer program product of claim 12, wherein the method is performed relative to a training set of images and a training set of exemplar class information corresponding to the training set of images.

15. The computer program product of claim 12, wherein the group disentangled visual feature embedding vectors are learned using a feature embedding network implemented by a deep neural network configured to perform multiclass classification, when labeled data is available.

16. The computer program product of claim 12, wherein the group disentangled visual feature embedding vectors are learned using a feature embedding network implemented by a deep autoencoder configured to perform input image reconstruction, when labeled data is unavailable.

17. The computer program product of claim 12, wherein the weight generation network maps the visual features and the semantic descriptions to the classification weights.

18. The computer program product of claim 12, wherein said learning step comprises:
   splitting the group disentangled visual feature embedding vectors into k groups that are independent with each other; and
   constructing new feature embedding vectors based on the k groups using a self-attention function.

19. The computer program product of claim 12, wherein said learning step comprises:
   training a discriminator using the group disentangled visual feature embeddings vectors generated by a mini-batch of the input images as positive data;
   shuffling the group disentangled visual feature embeddings vectors of the mini-batch in a group-wise manner to obtain negative data; and
   training the discriminator with the negative data.

20. A computer processing system for visual inspection, comprising:
   a memory device including program code stored thereon;
   a hardware processor, operatively coupled to the memory device, and configured to run the program code stored on the memory device to
      learn group disentangled visual feature embedding vectors of input images, the input images including defective objects and defect-free objects;
      generate, using a weight generation network, classification weights from visual features and semantic descriptions, both the visual features and the semantic descriptions for predicting defective and defect-free labels;
      calculate a cosine similarity score between the classification weights and the group disentangled visual feature embedding vectors;
      episodically train the weight generation network on the input images to update parameters of the weight generation network; and
      generate, using the trained weight generation network, a prediction of a test image as including any of defective objects and defect-free objects.

* * * * *